United States Patent Office 3,293,022
Patented Dec. 20, 1966

3,293,022
METHODS AND APPARATUS FOR PRODUCING TOUGHENED GLASS
John Reginald Beattie, Maghull, near Liverpool, England, assignor to Pilkington Brothers Limited, Liverpool, England, a corporation of Great Britain
Filed Apr. 1, 1963, Ser. No. 269,266
8 Claims. (Cl. 65—114)

This invention relates to methods of and apparatus for producing toughened glass.

In the well known process of toughening glass, the glass in sheet form is heated up to near the softening point of the glass and the surfaces of the glass sheet are then chilled by a flow of cool air directed upon them. In this way, a temperature difference between the surfaces and the central portion of the glass sheet is set up and a temperature difference in the glass sheet is maintained until the whole thickness of the glass sheet has been cooled below the strain point of the glass. The temperature differences between the surfaces and the central portion of the chilled glass is not allowed to disappear until the whole thickness of the glass sheet has been cooled to a temperature below the strain point of the glass. Stresses are thus set up between the central portion and the surfaces of the glass, whereby the central portion of the glass is in tension and the portions near the surface of the glass are in compression. A toughened glass sheet is therefore effectively divided into three portions or layers through its thickness, there being a layer of compression near each surface of the glass sheet and a layer of tension in the central portion of the glass sheet. When a uniform temperature is finally attained throughout the glass sheet, the forces of compression and tension respectively in the surface and central portions of the toughened glass sheet are at their maximum.

In this specification, by "chilling" the glass or the surface of the glass is meant accelerating the cooling so that heat is lost by the glass at a rate greater than by ordinary cooling, and the effect of chilling is that a rapid cooling takes place.

A graphical representation of the stress through a toughened glass sheet against the thickness of the glass for a glass sheet toughened by the conventional toughening process gives a curve having a parabolic form which is known as a normal parabolic stress distribution throughout the thickness of the glass.

The breaking strength of a toughened glass sheet may be increased by increasing the force of compression at the surface of the sheet. This can be done by increasing the rate of chilling of the surfaces by using a greater flow of the cool air to obtain a bigger temperature difference between the central portion and the surface of the glass sheet, but this method is expensive and wasteful in power.

It is a main object of the present invention to increase the breaking strength of toughened glass without having to increase the pressure of cooling air applied to the surfaces of the hot sheet of glass.

According to the present invention, the breaking strength of toughened glass is increased by modifying the normal parabolic stress distribution throughout the thickness of the glass by returning heat to the central portion of the glass during the chilling process.

According to one aspect of the present invention there is provided apparatus for chilling a sheet of hot glass in the process of toughening the glass, said apparatus comprising means for chilling the surfaces of a hot sheet of glass characterised by the provision of means for applying to the glass during the chilling of the surfaces such a preponderance of radiation of wavelengths to which the glass is partially transparent as compared with radiations of wavelengths to which the glass is opaque, that the cooling of the central portion of the hot sheet of glass is appreciably retarded.

In general, the transmission curve for glass shows a portion of high transmission in the visible region and in the infrared region of wavelength 1 to 2.5 microns. There is then a falling off in the percentage transmission until another fairly stable band of partial transmission occurs at wavelengths between 2.75 and 4.5 microns. Above wavelengths of 4.5 to 5 microns, the glass is virtually opaque. FIGURE 1 of the accompanying drawings shows curves for the spectral transmission of four thicknesses of polished plate glass.

When reference is made in this specification to radiations to which the glass is partially transparent, it is the wavelengths range of 0.4 to 4.5 microns which is meant. However of this range the fairly stable band of partial transmission occurring in general between 2.75 and 4.5 microns is the most significant.

As radiations of wavelengths below 4.5 microns pass through a glass sheet consistent absorption will occur throughout the thickness of the sheet. In the wavelengths band up to 2.75 microns the amount of absorption which takes place is of the order of 18% of the radiation falling on the glass within this wavelength region for a sheet of glass ³⁄₁₆ of an inch thick. In the range 2.75 to 4.5 microns the absorption of the glass is much higher, of the order of 90% for a sheet of glass ³⁄₁₆ of an inch thick. Over the whole range of 0.4 to 4.5 microns a heating of the glass throughout its thickness will occur, but a much greater heating of the glass throughout its thickness will occur when the glass is subjected to radiations in the wavelength band 2.75 to 4.5 microns.

However, in the event of radiations of wavelengths to which the glass is opaque falling upon the glass, these will be absorbed in the surfaces of the glass sheet, so that there will be a heating of the surfaces of the glass sheet without a corresponding radiant heating in the central portion of the glass. Accordingly the effect of such radiations falling on the glass is to lessen the toughening effect caused by the action of the chilling medium in the conventional toughening process.

There are two general ways in which radiations of wavelengths to which the glass is partially transparent may be applied to the glass. The more economical way is to provide reflecting means for reflecting to the glass radiations emitted therefrom and to which the glass is partially transparent and having the property of absorbing radiations emitted from the glass sheet and to which the glass is opaque.

According to this aspect, therefore, the present invention comprises apparatus for chilling a sheet of hot glass in the process of toughening the glass, said apparatus comprising cooling means between which the hot sheet of glass is positioned and by means of which a chilling medium is directed at the faces of the glass sheet positioned therebetween, and surfaces facing the glass sheet which surfaces are comprised by a material which has the property of reflecting a considerable proportion (that is more than 40%) of radiation to which the glass is partially transparent and absorbing a substantial majority (that is at least 80%) of radiation to which the glass is opaque.

Conveniently the said material is zirconium silicate or calcium silicate. Alternatively, however, the said material may comprise a sheet of glass of the order of 0.5 mm. thickness having on the surface further from the hot sheet of glass being chilled, a plating of highly reflective material. Conveniently the highly reflective material is gold.

The other way in which radiation to which the glass is partially transparent may be applied to the glass is by generating the radiations of the desired wavelengths independently. When the radiations are generated independently, a greater quantity of the radiations may be applied to the glass being toughened so that a greater degree of modification of the stress may be achieved by the use of separate generating means than is obtained using a reflecting means.

According to this aspect of the invention, therefore, there is provided apparatus according to the invention in which the means for applying radiation to the glass sheet comprises a plurality of lamps arranged to direct on to the glass sheet radiations having a wavelength below 5 microns.

Conveniently the said lamps emit radiations, substantially the whole of which radiation lies within a range from 0.4 to 5 microns.

It is possible for a combination of the two methods of applying radiations to the glass to be used, and according to this aspect of the invention, there are provided a plurality of lamps as described above, together with cooling means for chilling the surfaces of a glass sheet positioned therebetween, and surfaces facing the glass sheet which surfaces are comprised by a material which has the properties of reflecting a considerable proportion (that is more than 40%) of radiation to which the glass is partially transparent and adsorbing a substantial majority (that is at least 80%) of radiation to which the glass is opaque.

The cooling means may comprise quenching frames consisting of perforated pipes from which chilling air is applied to the glass sheet. In such a case, the surfaces which are comprised by a material having the properties of selective reflectivity given above, are special surfaces provided behind the quenching frames.

In another arrangement according to the invention, the cooling means is a pair of blowing boxes, and in this case, the surfaces carrying the material which the properties of selective reflectivity will be the surfaces of the blowing boxes themselves.

According to this aspect of the invention, therefore, there is provided apparatus for chilling a sheet of hot glass in the process of toughening the glass, said apparatus comprising blowing boxes between which the hot sheet of glass is positioned and by means of which a chilling medium is directed at the faces of the glass sheet positioned therebetween, the surfaces of the blowing boxes facing the glass sheet being coated with a material which has the property of increasing the reflectivity of the surfaces of the blowing boxes for radiation to which the glass is partially transparent and increasing the absorptivity of the said surfaces for radiation to which the glass is opaque.

The present invention also comprehends a method of toughening glass in sheet form wherein the glass sheet is heated up to near the softening point of the glass and then subjected to rapid chilling by streams directed simultaneously over both surfaces of the glass sheet, whereby a resultant temperature difference is achieved between the surfaces and the central portion of the glass sheet, characterised by retarding the cooling of the said central portion by directing on to the sheet of glass radiation of a wavelength to which the glass is partially transparent, whereby a glass having a modified stress distribution is obtained.

Furthermore, the present invention comprehends a method of toughening glass wherein the glass in sheet form is heated up to near the softening point of the glass and is then subjected to the action of a chilling medium directed at the surfaces of the glass sheet by cooling means whereby a temperature difference between the surfaces and the central portion of the glass sheet is obtained, characterised by carrying out the chilling process with the glass sheet between cooling means which has its surface facing the glass sheet coated with a material having the properties of increasing the reflectivity of the said surfaces for radiation to which the glass is partially transparent and increasing the absorptivity of the said surfaces for radiation to which the glass is opaque.

Additionally, the present invention comprehends a method of toughening a thin sheet of glass (that is to say a sheet of glass of thickness of 1/8 of an inch or less) comprising the steps of heating the thin sheet of glass up to near the softening point of the glass, subjecting the heated glass sheet to the action of a chilling medium directed at the surfaces of the glass sheet whereby a temperature difference between the surfaces and the central portion of the glass sheet is obtained, and, simultaneously with the action of the chilling medium, causing radiations of wavelengths to which the glass is partially transparent to be directed onto the glass sheet whereby the cooling of the said central portion is retarded and a thin sheet of toughened glass is obtained.

In order that the invention may be more clearly understood, reference will now be made to FIGURES 2 to 6 of the accompanying diagrammatic drawings, which show by way of example preferred embodiments of the invention, and in which:

FIGURE 2 is a part sectional view of a glass sheet positioned between cooling means comprising a blowing box having its surface facing the glass coated with a material having a selective reflectively, FIGURE 3 is a curve showing the diffuse spectral reflectivity of a material with which the surfaces of the blowing box of FIGURE 2 may be coated in accordance with the present invention, FIGURE 4 is a part sectional view of a glass sheet positioned between cooling means comprising a blowing box and having a plurality of lamps associated therewith, FIGURE 5 is a graphical representation of the wavelengths of the radiation emitted by the lamps used in the embodiment of FIGURE 4, and FIGURE 6 shows a part sectional view of a glass sheet positioned between cooling means comprising a blowing box having its surface facing the glass coated with a material having a selective reflectively and also including a plurality of lamps.

In the drawings, like reference numerals designate the same or similar parts.

Referring first to FIGURE 2 of the drawings, there are shown similar blowing boxes 1 and 2 having, in their surfaces facing a hot sheet of glass 3 positioned therebetween, a pattern of holes 4 from which air is blown on to the hot sheet of glass 3. The pressure of the air emerging from the holes 4 is of the order of 2 lbs. per sq. inch and the air is blown through the holes by simple fans (not shown) inside the respective blowing boxes 1 and 2.

As the glass sheet 3 is being chilled by air blown onto its surfaces from the blowing boxes 1 and 2, the sheet is also losing heat by radiation. The radiated heat lost by the surfaces of the glass sheet will include radiations of wavelength to which the glass is opaque as well as radiations of wavelength to which the glass is transparent, but the heat lost by radiations from the central portion of the glass sheet 3 will be only radiations of wavelengths to which the glass is transparent.

With a normal blowing box, the surfaces facing the glass sheet 3 have a spectral absorptivity of approximately 80% for the complete range of radiation wavelengths emitted by the glass sheet. Consequently approximately 20% of all the radiation wavelengths emitted by the glass sheet are reflected to it. However, according to the present invention, in the embodiment shown in FIGURE 2, the surfaces of the blowing boxes 1 and 2 facing the glass sheet 3 carry a coating 5 of zirconium silicate.

The coating 5 of zirconium silicate applied to the surfaces of the blowing boxes 1 and 2 is preferably about 5/1000 of an inch in thickness and is a particulate covering in nature rather than a film of zirconium silicate. The coating 5 may conveniently be deposited on the surfaces of the blowing boxes 1 and 2 as an atomised spray so that the particles of zirconium silicate sinter together on the surfaces of the blowing boxes 1 and 2.

Zirconium silicate is a material which has a high absorptivity for radiations of wavelengths in excess of 5 microns, that is wavelengths to which the glass is opaque and a reflectivity of the order of 50–60% for radiation of wavelengths to which the glass in transparent. FIGURE 3 is a curve showing the diffuse spectral reflectivity of zirconium silicate.

When the blowing boxes 1 and 2 having surface coatings 5 of zirconium silicate as shown in FIGURE 2 are employed in the toughening process, more of the radiations emitted by the glass in the wavelength range above 5 microns are absorbed by the zirconium silicate than would be absorbed if there was no coating 5 because the absorptivity of zirconium silicate is above 80%. As will be seen from the figures already quoted, the zirconium silicate coating 5 has a large increased reflectivity for radiations of wavelengths to which the glass is transparent over the material from which the blowing boxes 1 and 2 are made, so that there is a considerable increase in the quantity of radiations in the wavelength region 0.4 to 4.5 microns which are reflected from the blowing boxes to the glass sheet 3.

Of the radiation in the wavelength range 2.75 to 4.5 microns which is reflected back to the glass, in the case where the glass sheet 3 is a 6 mm. sheet of glass, approximately 60% of the reflected radiation will pass through the surface layer of lower temperature in the glass and enter the central region and by far the majority of the radiation which enters the central region will be absorbed in that region. Because the central region is thicker than the surface layers in the heated glass sheet, which surface layers will correspond to bands of compression in the toughened glass sheet, the quantity of heat absorbed in the central portion of the glass is greater than that absorbed in the surface layers so that an enhanced temperature difference between the central portion and the surfaces of the glass sheet is achieved.

Referring now to FIGURE 4, there are again shown similar blowing boxes 1 and 2 arranged to chill the hot glass sheet 3 placed between them. However, in FIGURE 4, the surfaces of the blowing boxes 1 and 2 facing the hot sheet of glass 3 do not carry a coating 5 but instead there are provided, mounted on the surfaces of the blowing boxes which face the hot glass sheet, a plurality of lamps 6. The lamps 6 are arranged over the surfaces of the blowing boxes 1 and 2 to cover the whole area of the surfaces in a similar way to that in which the holes 4 are provided in a pattern over the entire surfaces.

The lamps 6 are lamps which will emit radiations in the wavelengths to which the glass is transparent and including the wavelength region 2.75 to 4.5 microns. An example of a suitable lamp is a high intensity infrared incandescent filament tubular quartz lamp. In FIGURE 5, there is shown a typical spectral radiation curve for such a lamp and it will be seen that all the radiation emitted by it is in the region of from 0.4 microns to 5 microns.

In the arrangement of FIGURE 4, therefore, a smaller proportion, approximately 20% of all the radiations emitted by the glass sheet 3 will be reflected to it by the surfaces of the blowing boxes 1 and 2, but the ratio of the radiations of wavelengths to which the glass is partially transparent to the radiations to which the glass is opaque will be greatly increased by the use of the lamps 6 which emit no radiation of wavelength greater than 5 microns to which the glass is opaque. Consequently the use of the lamps 6 will increase the temperature difference occurring between the central portion and the surfaces of the glass sheet 3 during the chilling process.

In FIGURE 6 of the accompanying drawings, there is shown an embodiment of the invention which utilises the features of both the embodiments of FIGURES 2 and 4 already described. The temperature difference existing in the glass sheet 3 during the chilling process is therefore increased by the coating 5 of zirconium silicate and also by the use of the lamps 6. However, it will be observed that in this case where lamps are used with the zirconium silicate coating, the number of lamps used need not be as great as in the case where the lamps 6 are used without any selectively reflective coating of zirconium silicate.

The coating 5 need not necessarily be of zirconium silicate, but other coatings may be employed provided that these have the same qualities of selective reflectivity as zirconium silicate. For example, the surfaces of the blowing boxes 1 and 2 facing the hot glass sheet 3 may carry a thin band of glass, that is to say, a glass sheet of approximately ½ mm. in thickness. On the side of the glass sheet which is in contact with the surface of the blowing box, there is provided a highly reflective plating, conveniently of gold.

Substantially no reflection of radiations emitted by the glass sheet will occur at the surface of the band of glass nearest to the glass sheet 3, but there will be a substantial reflection at the gold plating on the other surface of the glass band. However, clearly the radiations reflected at the gold plate will not include any radiations to which the glass is opaque so that the effect of the gold plated glass band is the same as that of a zirconium silicate coating.

Another alternative to a coating of zirconium silicate is a coating of calcium silicate. A coating of calcium silicate is conveniently deposited as a particulate covering by a base exchange method, for example using sodium silicate.

By the use of the present invention, it is found that a considerable increase in the breaking strength of a toughened glass sheet may be obtained without any variation in the temperature of the glass sheet as it is placed between the blowing boxes 1 and 2, the velocity of the air emitted by the blowing boxes, or the time for which the cool air is blown on the hot glass sheet 3.

Furthermore, observations of the stress pattern in the glass show that this stress pattern takes a modified form in which a flattening of the parabola occurs and consequently the ratio of the compressive stress at the surface to peak tensile stress in the interior of the wall portion is increased. This increases the breaking strength of the article.

By retarding the rate of cooling at the midplane in the interior of the wall portion of the glass article, it is possible to build up a higher temperature difference between the surfaces and the interior of the wall portion during the normal quenching cycle than would otherwise be the case.

Another very substantial advantage deriving from the use of the present invention is that it is possible, as a commercial proposition, to toughen glass sheets of ⅛ of an inch thickness or less. Hitherto such glass sheets could only be toughened where an ample supply of high pressure air was available, and then difficulties arose because the strength of the air blast required was so great that the suspended glass sheet was disturbed, and individual jets frequently marked the surface of the glass sheet.

However, the use of infrared lamps to apply to the heated glass sheet radiations to which the glass is partially transparent while the glass is being chilled by a supply of air at a normal pressure for a toughening process, say 1–2 lbs./sq. in. (25 in. water gauge), has enabled glass sheets of a thickness of ⅛ of an inch and less to be toughened as a commercial proposition and without the disadvantages previously encountered in toughening thin sheets of glass.

I claim:
1. A method of toughening glass in sheet form comprising the steps of heating the glass sheet to a temperature near the softening point of the glass, rapidly chilling the glass sheet by directing streams of chilling medium simultaneously over both surfaces of the glass sheet while the glass sheet is also losing heat by radiation, and, simultaneously with said rapid chilling, reflecting to the region of the glass being chilled a considerable proportion of the radiation emitted therefrom which lies in the wavelength range 2.75 microns to 4.5 microns, to which radiation the glass is partially transparent, and absorbing a substantial majority of the radiation emitted therefrom and having a wavelength greater than 5 microns, to which radiation the glass is opaque, said reflecting and absorbing steps being continued long enough to produce a temperature differential between the inside and the surfaces of the glass sheet, greater than would be produced in the absence of said reflecting and absorbing steps, whereby a toughened glass sheet having a modified stress distribution is obtained.

2. Apparatus for chilling a sheet of glass hot enough to emit heat radiations in the process of toughening the glass, comprising quenching means for chilling the surfaces of a hot sheet of glass by directing streams of chilling medium onto both surfaces of the hot glass sheet, and means for directing onto the glass sheet, while the surfaces thereof are being chilled by the chilling medium, radiations in the wavelength range of 2.75 microns to 4.5 microns to which radiations the glass is partially transparent, and while the radiation to the glass of radiations of wavelength greater than 5 microns is substantially avoided, said radiation directing means comprising radiation reflecting means for reflecting to the glass sheet radiations emitted therefrom and to which the glass is partially transparent and having the property of absorbing radiations emitted from the glass sheet and to which the glass sheet is opaque, said reflecting means being selected from the group consisting of a selectively reflecting surface of zirconium silicate, a selectively reflecting surface of calcium silicate and a sheet of glass of the order of 0.5 mm. thickness having on its surface further from the hot sheet of glass being chilled a plating of highly reflective material, said reflecting means being located to reflect the radiations from said glass sheet to the region of the glass sheet being chilled by said quenching means.

3. Apparatus for chilling a sheet of hot glass in the process of toughening glass, comprising quenching means for chilling the surfaces of a hot sheet of glass by directing streams of chilling medium onto both surfaces of the hot glass sheet, and means for directing onto the glass sheet, while the surfaces thereof are being chilled by the chilling medium, radiations in the wavelength range 2.75 microns to 4.5 microns to which radiations the glass is partially transparent, and while the radiation to the glass of radiations of wavelength greater than 5 microns is substantially avoided, said radiation directing means comprising lamps which emit radiations lying substantially wholly within a range from 0.4 to 5 microns, said directing means being located in position to direct the radiations to the region of the glass sheet being chilled by said quenching means.

4. Apparatus for chilling a sheet of glass hot enough to emit heat radiations in the process of toughening the glass, said apparatus comprising blowing boxes between which the hot sheet of glass is positioned and by means of which a chilling medium is directed at the faces of the glass sheet positioned therebetween, the surfaces of the blowing boxes facing the glass sheet being selectively reflecting surfaces having the property of increasing the reflectivity of the surfaces of the blowing boxes for radiations lying in the wavelength range 2.75 microns to 4.5 microns to which radiation the glass is partially transparent, and increasing the absorptivity of the surfaces of the blowing boxes for radiations of wavelength greater than 5 microns, to which radiation the glass is opaque, said selectively reflecting surfaces being selected from the group consisting of zirconium silicate, calcium silicate and a sheet of glass of the order of 0.5 mm. thickness having on its surface further from the hot sheet of glass being chilled a plating of highly reflective material.

5. Apparatus for chilling a sheet of glass hot enough to emit heat radiations in the process of toughening the glass, said apparatus comprising blowing boxes between which the hot sheet of glass is positioned and by means of which a chilling medium is directed at the faces of the glass sheet positioned therebetween, the surfaces of the blowing boxes facing the glass sheet being selectively reflecting surfaces having the property of increasing the reflectivity of the surfaces of the blowing boxes for radiations lying in the wavelength range 2.75 microns to 4.5 microns to which radiation the glass is partially transparent, and increasing the absorptivity of the surfaces of the blowing boxes for radiations of wavelength greater than 5 microns, to which radiation the glass is opaque, each of said selectively reflecting surfaces being constituted by a sheet of glass of the order of 0.5 mm. thickness having on its surface further from the hot sheet of glass being chilled a plating of gold.

6. A method of toughening glass in sheet form, comprising the steps of heating the glass sheet to a temperature near the softening point of the glass, rapidly chilling the glass sheet by directing streams of chilling medium simultaneously over both surfaces of the glass sheet and simultaneously with said rapid chilling, generating radiations in the wavelength range of 2.75 microns to 4.5 microns, to which radiations the glass is partially transparent, and directing said radiations at said surfaces as said surfaces are being rapidly chilled, while substantially preventing the direction at said surfaces of the glass sheet, radiations having a wavelength greater than 5 microns, to which radiations the glass is opaque, said generating, directing and preventing steps being continued long enough to produce a temperature differential between the inside and the surfaces of the glass sheet, greater than would be produced in the absence of said generating, directing and preventing steps, whereby a toughened glass sheet having a modified stress distribution is obtained.

7. Apparatus for chilling a sheet of hot glass in the process of toughening glass, comprising quenching means for chilling the surfaces of the hot sheet by directing streams of chilling medium onto both surfaces of the hot glass sheet, means for generating radiations in the wavelength range of 2.75 microns to 4.5 microns, to which radiations the glass is partially transparent, and means operable while said glass sheet surfaces are being chilled by said qeunching means for directing at the glass sheet those generated radiations, which are substantially free of radiations greater than 5 microns, said directing means being located in position to direct the generated radiations to the region of the hot glass sheet being chilled.

8. Apparatus for chilling a sheet of glass hot enough to emit heat radiations in the process of toughening the glass, comprising quenching means for chilling the surfaces of the hot sheet by directing streams of chilling medium onto both surfaces of the hot glass sheet, and radiation reflecting means flanking and facing opposite surfaces of the glass sheet and made of a material, which reflects to the glass sheet those radiations emitted therefrom in the wavelength range of 2.75 microns to 4.5 microns and which will absorb substantially all of those emitted radiations greater than 5 microns, said reflecting means being located in position to reflect the radiations from said glass sheet to the region of the glass sheet being chilled by said quenching means.

References Cited by the Examiner

UNITED STATES PATENTS 2,068,799   1/1937   Guyer _____ 65—115

FOREIGN PATENTS 726,626   3/1955   Great Britain.
730,265   5/1955   Great Britain.

DONALL H. SYLVESTER, *Primary Examiner.*

S. LEON BASHORE, *Examiner.*

A. D. KELLOGG, *Assistant Examiner.*